United States Patent
Hu et al.

(10) Patent No.: US 8,193,294 B2
(45) Date of Patent: Jun. 5, 2012

(54) NETWORKS CONTAINING PERFLUOROCARBON ORGANOSILICON HYPERBRANCHED POLYMERS

(75) Inventors: Jin Hu, Stow, OH (US); Quiyun Xu, Midland, MI (US); Rakesh Sachdeva, Mundhwa (IN); Dale J. Meier, Midland, MI (US); Robert M. Nowak, Midland, MI (US); Petar R. Dvornic, Midland, MI (US)

(73) Assignee: Michigan Molecular Institute, Midland, MI (US)

( * ) Notice: Subject to any disclaimer, the term of this patent is extended or adjusted under 35 U.S.C. 154(b) by 80 days.

(21) Appl. No.: 12/934,307

(22) PCT Filed: Mar. 24, 2009

(86) PCT No.: PCT/US2009/001824
§ 371 (c)(1),
(2), (4) Date: Oct. 18, 2010

(87) PCT Pub. No.: WO2009/120309
PCT Pub. Date: Oct. 1, 2009

(65) Prior Publication Data
US 2011/0054137 A1    Mar. 3, 2011

Related U.S. Application Data

(60) Provisional application No. 61/070,597, filed on Mar. 24, 2008.

(51) Int. Cl.
*C08G 77/50*    (2006.01)

(52) U.S. Cl. .............................. 528/31; 528/25; 528/401
(58) Field of Classification Search ........................ None
See application file for complete search history.

(56) References Cited

U.S. PATENT DOCUMENTS

| | | |
|---|---|---|
| 4,618,734 A | 10/1986 | Baum et al. |
| 5,969,073 A | 10/1999 | Seyferth et al. |
| 6,291,021 B1 | 9/2001 | Morita et al. |
| 6,384,172 B1 | 5/2002 | Dvornic et al. |
| 6,646,089 B2 | 11/2003 | Dvornic et al. |
| 6,995,215 B2 | 2/2006 | Dvornic et al. |
| 2002/0016433 A1 | 2/2002 | Keller et al. |
| 2003/0069370 A1 | 4/2003 | Dvornic et al. |
| 2005/0096444 A1 | 5/2005 | Lee et al. |
| 2006/0147414 A1 | 7/2006 | Kaganove et al. |

OTHER PUBLICATIONS abstract of IT 1343534 B1 and accompanying synthesis information from SciFinder.*

* cited by examiner

*Primary Examiner* — Marc Zimmer
(74) *Attorney, Agent, or Firm* — Technology Law PLLC; Karen L. Kimble

(57) ABSTRACT

The present invention relates to hyperbranched copolymer networks containing hyperbranched copolymers that have perfluorocarbon and organosilicon entities that have high hydrophobicity, or high oleophobicity, or high thermal stability, or good adhesion to substrates, or any combinations thereof. This invention provides a further desirable combination of properties that include solubility before crosslinking, chemical resistance, and easy processibility. The copolymers may be crosslinked with a variety of crosslinking agents to give either rigid or elastomeric networks.

10 Claims, 3 Drawing Sheets

| | | | |
|---|---|---|---|
|  |  |  |  |
| a) Coating from HBP-(SiOEt)-(SiMe$_2$H) | b) Coating from HBP-Allyl[(CF$_2$)$_4$]-(SiMe$_2$H) | c) Coating from Fluorinated HBP-Allyl[(CF$_2$)$_6$]-(SiMe$_2$H) | d) Teflon Tape MIL-SPEC-T277 30A, DuPont |
| 111° | 116° | 125° | 133° |

NETWORKS CONTAINING PERFLUOROCARBON ORGANOSILICON HYPERBRANCHED POLYMERS

FEDERALLY SPONSORED RESEARCH STATEMENT

This invention was made with Government support under Award No. W31P4Q-05-C-R-114 from the Army, Department of Defense, to Oxazogen, Inc. as the award recipient and as its subcontractor to Michigan Molecular Institute. The Government has certain rights in this invention.

FIELD OF THE INVENTION

This invention concerns perfluorocarbon organosilicon polymer networks containing hyperbranched domains.

BACKGROUND OF THE INVENTION

The linear perfluorohydrocarbon polymer—polytetrafluoroethylene (PTFE)—is one of the most hydrophobic and oleophobic materials known and has excellent thermal and chemical stability. [For example, see "Chemistry of Organic Fluorine Compounds II: A Critical Review" (ACS Monograph, ISSN 0065-7719; 187), edited by Miloš Hudlický/and Attlila E. Pavlath, 1995; and "Organofluorine Chemistry: Principle and Commercial Applications" edited by R. E. Banks, B. E. Smart, and J. C. Tatlow, 1994.] However, one disadvantage of PTFE is that it cold flows under elevated pressure and/or temperature which has limited its use in some applications, e.g., in the coating of bearings. [See U.S. Pat. Nos. 4,237,376 and 4,618,734.]

Additional disadvantages of PTFE are: a very high melting point of the crystalline $CF_2CF_2$ chains that make it difficult to process; and its lack of solubility in commonly used solvents which limits its application as a solution-born coating material. Also, PTFE cannot be used for liquid-based applications such as a lubricating fluid or as a base oil for greases.

These adverse effects which result from PTFE's crystalline nature have been alleviated by: a) reducing the crystallinity by copolymerization with other entities, or b) replacing some of the fluorine atoms in the $C_2F_2$ chain(s) with other groups. Examples of such copolymers are fluorinated ethylene propylene resins (FEP), perfluoroalkoxy resins (PFA), poly(chlorotrifluoroethylene)s (PCTFE), perfluorocarbon ethers and similar copolymers. However, incorporation of other entities to form copolymers often adversely affects thermal properties, chemical stability and the surface energy of the resulting materials to varying, and unpredictable degrees. For example, the incorporation of polar groups such as ethers, esters, amides or chlorine will reduce the hydrophobicity and oleophobicity of the copolymers. [For example, see "Chemistry of Organic Fluorine Compounds II: A Critical Review" (ACS Monograph, ISSN 0065-7719; 187), edited by Miloš Hudlický and Attila E. Pavlath, 1995; and "Organofluorine Chemistry: Principle and Commercial Applications" edited by R. E. Banks, B. E. Smart, and J. C. Tatlow, 1994.] Copolymers that retain the $CF_2$ backbone can retain some or most of the desirable properties of PTFE while improving other properties such as processibility, solubility, low $T_g$ and the ability to be crosslinked. Such a combination of properties makes these materials very interesting and provides many applications. Known copolymers that contain a $CF_2$ backbone have been limited to linear polymers or to crosslined networks. [See U.S. Pat. Nos. 4,237,376 and 4,618,734.]

Hydrophobic and oleophobic fluorocarbon networks made from small molecular fluorocarbons have been described, e.g., networks from perfluoroalkylene acetylene compounds. [See U.S. Pat. Nos. 4,237,376 and 4,618,734.] These compounds prior to curing are not polymers and are volatile in high-temperature curing. Also, the viscosities of their formulations are not readily adjustable.

Some curable linear fluorocarbon network-forming copolymers include the DuPont Fluoropolymer B (65% vinylidene fluoride, 25% tetrafluoroethylene and 10% vinylbutyrate), the Abcite® and Lucite® fluoropolymers (based on crosslinked mixtures of hydroxyl-fluoropolymers) and Lumiflon® fluoropolymer (a copolymer of tetrafluoroethlene with a monomer having hydrophilic side groups). These fluorocarbon network-forming polymers generally contain polar groups.

Networks of hydrophobic hyperbranched polymers that contain silicon entities such as polycarbosiloxanes have been described [see U.S. Pat. Nos. 6,384,172 and 6,646,089], but networks of hyperbranched perfluorocarbon polymers have not been reported.

BRIEF SUMMARY OF THE INVENTION

This invention relates to hyperbranched copolymer networks containing perfluorocarbon and organosilicon entities that have high hydrophobicity, or high oleophobicity, or high thermal stability or good adhesion to substrates or any combinations of these properties. This invention further provides a desirable combination of properties that include solubility before crosslinking, chemical resistance, and easy processibility. Although such networks may contain polar groups (as defined herein), preferably they are free of such polar groups.

These networks are prepared from hyperbranched polymers that contain perfluorocarbon and organosilicon entities and a variety of crosslinking agents and can be either rigid or elastomeric, with good adhesion to substrates. Furthermore, part of the hyperbranched polymer's multiple functionalities can be used for modifications that can provide additional properties (such as crosslinkability without the need for crosslinkers, or increased coating adhesion).

Such networks are expected to have applications in a variety of different fields including: high performance lithographic or printing coatings, special adhesives, passivation layers for microprocesssors in electronics, water-repellent and oil-resistant sealant gaskets, anti-icing coatings, fingerprint free surfaces such as for cell-phone screens, soil-resistant carpets, and high-performance elastomers.

DETAILED DESCRIPTION OF THE INVENTION

Glossary

Figure 1:
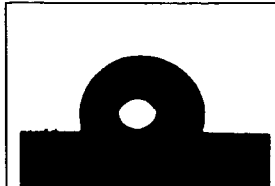
FIG. 1 shows a comparison of water contact angles of the networks of Example 15.
Figure 1:
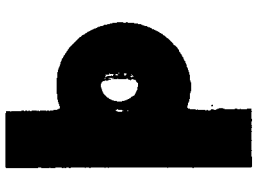
Figure 1:
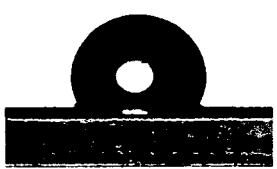
Figure 1:
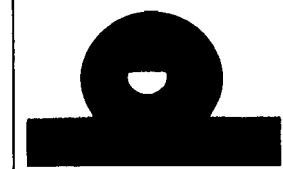

The following terms as used in this application are to be defined as stated below and for these terms, the singular includes the plural.

"CA" means contact angle; desired is from about 95° to about 135° C.

"DSC" means Differential Scanning calorimetry

"FTIR" means Fourier Transform Infrared Spectroscopy

"GPC" means Gel Permeation Chromatography. Molecular weights measured by GPC were calibrated with polystyrene standards using PL gel 34-5/34-2 columns, toluene eluent and refractive index detector "HBP" means hyperbranched polymer; this is a specific class of dendritic polymers and excludes dendrimers, dendrons, and dendrigrafts "hr" means hour(s)

"J" means coupling constant

"min" means minute(s)

"M$_n$" means number average molecular weight

"M$_w$" means weight average molecular weight

"PCTFE" means poly(chlorotrifluoroethylene)

"FEP" means fluorinated ethylene propylene resin

"PFA" means perfluoroalkoxy resin

"polar groups" means ether, ester, amine, urea, and hydroxyl moieties

"PTFE" means polytetrafluoroethylene; a linear polymer

"RT" means ambient temperature or room temperature, from about 22 to about 25° C.

"sec" means second(s)

"solvents" means a liquid that can dissolve the HBP copolymer having perfluorocarbon and organosilicon entities; examples are organic solvents such as hexane, diethyl ether, acetone, dichloromethane, tetrahydrofuran and chloroform. Depending on the polar group content of and location on the HBP, other more polar solvents, such as isopropanol, may be used "T$_g$" means glass transition temperature that is defined in ASTM D3417, D3418 and E1356; "low Tg" means in the range of about −120° C. to about 25° C.

"TGA" means Thermal Gravimetric Analysis

"THF" means tetrahydrofuran

"T$_m$" means melting temperature

This invention relates to networks of hyperbranched copolymers containing perfluorocarbon and organosilicon entities that have high hydrophobicity, or high oleophobicity, or high thermal stability, or good adhesion to substrates, or any combinations thereof.

The hyperbranched perfluorocarbon/silicone copolymers of the present invention have excellent processability and solubility properties and have the flexibility to be modified to convey other desired properties that provide for many applications.

Additionally, soluble, hydrophobic and oleophobic multi-functionalized hyperbranched copolymers containing fluorocarbon scaffold are of interest. They are readily crosslinked by known methods to form thermally-stable, hydrophobic and oleophobic network materials. This invention utilizes such hyperbranched copolymers containing perfluorocarbon and organosilicon entities to form hydrophobic, oleophobic and/or thermally stable networks. The present networks high hydrophobicity is shown by the water contact angle of the network surface in the range of about 95° to about 135°. The high oleophobicity of the present networks is shown by the CH$_2$I$_2$ contact angle of the network surface of >90°. The present networks high thermal stability is shown by lack of degradation below 150° C. These hyperbranched copolymers have a glass transition temperature in the range from about −120° C. to about 25° C.

The crosslinking process can be solvent born or not; (e.g., where at least one of the reactants are liquids). Additionally, the hyperbranched copolymer is soluble before crosslinking and is readily processed. When the hyperbranched copolymers contain appropriate reactive functional end groups, they can be crosslinkable by light, heat, moisture, radiation or catalysis. The networks from hydrophobic hyperbranched polymers containing silicon entities such as polycarbosiloxanes have been disclosed (U.S. Pat. Nos. 6,384,172 and 6,646,089), but networks prepared from hydrophobic and oleophobic hyperbranched polymers containing a perfluorocarbon scaffold have not been reported. Such materials would have both hydrophobic and oleophobic properties and be more thermal stability than the networks from hyperbranched polycarbosiloxane resins. Part of the functionalities on the hyperbranched polymer surface can also be available for surface adhesion. Good surface adhesion at room temperature will be manifested by any of the following properties: not an easy release of the coating from the surface of the substrate, not an easy scrape-off of the coating from the surface of the substrate, difficult peel-off of the coating from the surface of the substrate, and long-term retention of any of the former properties.

The present invention uses hydrophobic and oleophobic, multi-functionalized hyperbranched perfluorocarbon/siloxane polymers including those that are free of polar groups. The polymers can readily be cross-linked to form thermally stable, chemically-resistant, hydrophobic and oleophobic networks by hydrosilylation reactions well known in this art. Part of the functionalities on the hyperbranched polymer surface can also be available for surface adhesion. The hyperbranched perfluorocarbon/siloxane polymers can be prepared as shown below in Scheme 1 for the synthesis of hyperbranched perfluorocarbon/siloxane polymers from divinylperfluoroalkane and in Scheme 2 for the synthesis of hyperbranched perfluorocarbon/siloxane polymers from diallyl perfluoroalkanes. The reactions shown in both schemes are carried to complete consumption of the minor components.

Scheme 1

Scheme 2

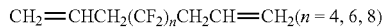

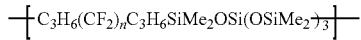
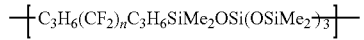

The hyperbranched polymers containing the —SiMe$_2$H chain ends in Schemes 1 and 2 were prepared by a hydrosilylation reaction using a bimolecular polymerization approach. By this approach [see U.S. Pat. No. 6,384,172] hyperbranched polymers are prepared by the reaction of multi-functional A and B monomers, e.g., A$_2$+B$_3$, or generically A$_x$+B$_y$, where x≧2 and y≧3. In order to avoid crosslinking to form gels, the polymerization conditions must be controlled such that $rp^2 \leq 1/[(x-1)(y-1)]$, where r is the stoichiometric molar ratio of the reacting functionalities (i.e., r=[A]/[B]) and p is the extent of the reaction determined with respect to the lesser component. Such polymerization conditions assume that all functional groups of the same type are equally reactive, and that no cyclization and no side reactions occur. In practice, there are deviations from the theoretical r and p value for the critical gel point. Hyperbranched polymers can have A chain ends or B chain ends or both depending on which component is in excess and the extent of reaction p. Therefore, vinyl-ended hyperbranched (perfluorocarbon-siloxane) polymers can also be made from the same reactions as shown in Schemes 1 and 2 by using an excess of vinyl- or allyl-containing monomers.

In one aspect of Schemes 1 and 2, processes for preparing hyperbranched copolymers were done by reacting an organosilicon monomer containing —SiR$_1$R$_2$H groups, where R$_1$ and R$_2$ are independently alkyl, alkoxyl or H, and a perfluoroalkane containing allyl or vinyl functionalities, wherein the number of SiH or allyl (vinyl) functionalities must be equal to or greater than 2 and one must be equal to or greater than 3. In another aspect, reaction of organosilicon monomers containing vinyl or allyl functionalities, and perfluoroalkane monomers containing —SiR$_1$R$_2$H groups, where R$_1$ and R$_2$ are alkyl, alkoxyl or H, wherein the number of SiH or allyl (vinyl) functionalities must be equal to or greater than 2 and one must be equal to or greater than 3. In a further aspect, hyperbranched copolymers were prepared from organosilicon monomers containing —SiR$_1$R$_2$H groups, where R$_1$ and R$_2$ are alkyl, alkoxyl or H, and perfluoroalkane monomers containing vinylether (CH$_2$=CHO—) or allylether (CH$_2$=CHCH$_2$O—) groups, wherein the number of SiH or allyl (vinyl)ether functionalities must be equal to or greater than 2 and one must be equal to or greater than 3.

According to a study by Guida-Pietasata (B. Ameduri, et al., *J. Polym. Sci: Part A: Polym Chem,* 1996, 34, 3077-3090), there can be a side reaction of reverse hydrosilylation addition of the silyl group on the beta position of the double bond and subsequent elimination of the silyl group with a neighboring fluorine atom to generate small amounts of —CF=CH—CH$_3$. This was the case with hyperbranched (perfluorocarbon-siloxane) polymers made by hydrosilylation of divinylfluoroalkanes. The structures of the HBP—[(CF$_2$)$_n$]—(SiMe$_2$H) (n=4, 6, 8) polymers shown in Scheme 1 are ideal structures. The actual hyperbranched polymers will have small concentrations of defect branches with —CF═CH—CH$_3$ chain ends from these side reactions and segments from subsequent side reactions of the —CF═CH—CH$_3$.

In contrast to the hyperbranched polymers from divinylfluoroalkanes, the hyperbranched polymers HBP-allyl[(CF$_2$)$_n$]—(SiMe$_2$H) from diallylfluoroalkanes in Scheme 2 did not have the —CF═CH—CH$_3$ defect structures because allyfluoroalkanes do not undergo such side reactions.

The functional end-groups of hyperbranched (perfluorocarbon-siloxane) polymers can be converted to other functionalities such as alkoxysilanes, silanol or acrylates that can self-crosslink to form networks. For example, the HBP-allyl[(CF$_2$)$_n$]—(SiMe$_2$H) has been modified with vinyltrimethoxysilane and vinyltriethoxysilane as shown in Scheme 3 below (see Example 7 and 8 below) to give end-capped hyperbranched (perfluorocarbon-siloxane) polymers that crosslink to form networks via the condensation reaction of silanols formed by the hydrolysis of alkoxysilanes (see Example 14 below and Scheme 3).

Scheme 3

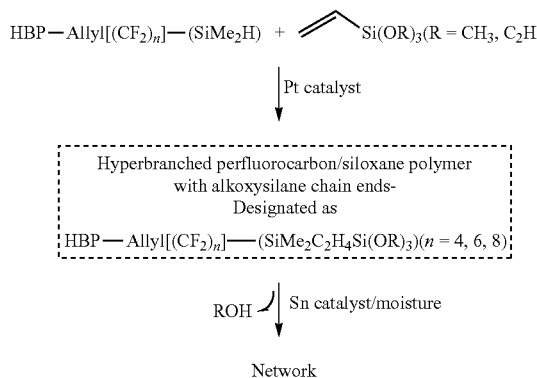

The hyperbranched (perfluorocarbon-siloxane) polymers can also be crosslinked with small molecular crosslinkers. For example, HBP—[(CF$_2$)$_n$]—(SiMe$_2$H) can be crosslinked with CH$_2$═CHCH$_2$(CF$_2$)$_n$CH$_2$CH═CH$_2$ (n=4-20) by a hydrosilylation reaction to form a network.

The hyperbranched (perfluorocarbon-siloxane) polymers can also be crosslinked with another hyperbranched (perfluorocarbon-siloxane) polymer. For example, HBP-[(CF$_2$)$_n$]—(SiMe$_2$H) can be crosslinked with HBP—[(CF$_2$)$_n$]-(Allyl) (n=4, 6, 8) by a hydrosilylation reaction.

The hyperbranched (perfluorocarbon-siloxane) polymers can be crosslinked with hydrophobic telechelic linear polymers. For example, HBP-allyl[(CF$_2$)$_n$]—(SiMe$_2$H)(n=6, 8) have been crosslinked with telechelic divinyl polydimethylsiloxane to form hydrophobic networks. These are shown by Example 15 below.

HBP-allyl[(CF$_2$)$_n$]—(SiMe$_2$H)(n=6) was also crosslinked with linear polymers containing fluorocarbon entities, such as the telechelic diallyl poly(perfluoroalkane-siloxane). As shown by Example 16 below.

A series of such telechelic diallyl poly(perfluoroalkane-siloxane)s were synthesized as shown in Scheme 4 below for crosslinking reactions with hyperbranched (perfluorocarbon-siloxane) polymers. These are shown by Examples 9, 10 and 11 below.

Scheme 4

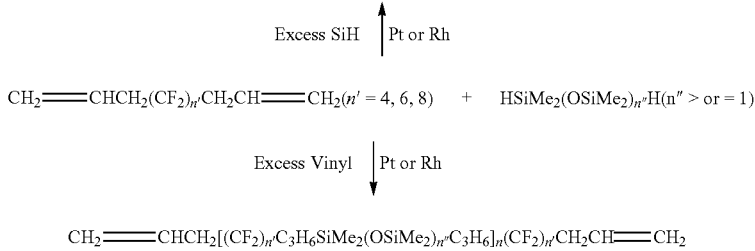

Hydrido-terminated (HMe$_2$Si) telechelic linear poly(perfluoroalkane-siloxane)s can also be prepared by using excess dihydridosiloxane in the reaction shown in Scheme 4. The hydrido-terminated linear polymer can be used to crosslink vinyl- and/or allyl-terminated hyperbranched (perfluorocarbon-siloxane) polymers to form networks.

The above-described networks can also be prepared using hyperbranched polymers such as hyperbranched (perfluoro-ether-siloxane) polymers prepared by the hydrosilylation reaction of perfluoro diallyl ether CH$_2$═CHCH$_2$O(CF$_2$)$_2$OCH$_2$CH═CH$_2$ with hydridosilane or hydridosiloxane containing 3 or more SiH groups. [See US Published Application 2006/01474141 A1 for the teaching of these hyperbranched polymers.]

EXAMPLES

The invention will be further clarified by a consideration of the following examples, which are intended to be purely exemplary of the present invention.

Example 1

Synthesis of hyperbranched (perfluorocarbon/siloxane) polymers HBP-[(CF$_2$)$_n$]—(SiMe$_2$H)(n=4) using 1,4-divinyloctafluorobutane (A$_2$) and tetrakis(dimethylsiloxy)silane (B$_4$) with [B$_4$]/[A$_2$] ratio of 1.3

A 50 mL round-bottom flask equipped with a vertical cooling condenser was charged with 1,4-divinyloctafluorobutane (2.52 g, 85.5%, 8.50 mmol), tetrakis (dimethylsiloxy)silane (3.77 g, 97%, 11.13 mmol) and 10 mL of anhydrous THF. It was flushed and then stirred under N$_2$ for 5 min. To the reaction mixture was added 12.5 mg of the Karstedt's catalyst (~2% platinum-divinyltetramethyldisiloxane complex in xylene) which was then stirred at RT for 1 hr, followed by heating in an oil bath at 50° C. for 2 days and to 65° C. for another 16 hrs. The volatiles were then stripped off in a rotary evaporator. The product was washed with anhydrous acetonitrile (3×10 mL). Each time, the solution was pre-cooled with a dry ice bath before the acetonitrile was decanted from the product phase. The volatiles were stripped off in a rotary evaporator at RT, and the resulting colorless viscous oil product was further dried in a vacuum overnight. A viscous colorless oil designated as HBP—[(CF$_2$)$_n$]—(SiMe$_2$H) (n=4) (1.3 g) was obtained. Its spectral and other data were as follows:

IR on KBr disc (selected peaks in cm$^{-1}$): 2963, 2902, 2867, 2134 (SiH), 1712 (trace), 1311, 1259, 1204, 1158, 1075 (broad), 903, 840, 772, 719, 625;

$^1$H NMR (CDCl$_3$, selected peaks in ppm): (1) Peaks assigned to the ideal polymer structure from hydrosilylation reaction: 0.16 (s, SiCH$_3$), 0.17 (s, SiCH$_3$), 0.20 (s, SiCH$_3$), 0.25-0.26 (m, SiCH$_3$), 0.96 (t, $^3$J 7.3 Hz, CF$_2$CH$_2$CH$_2$Si), 1.66 (b, CF$_2$CH$_2$CH$_2$Si), 4.77 (septet, 4.77, $^3$J 2.6 Hz, SiMe$_2$H); (2) Unidentified peaks from the side reaction: 0.93-0.98 (m), 1.60-1.25 (m), 3.4-3.8 (m), 3.73 (t, J: 0.022 Hz);

$^{19}$F NMR (CDCl$_3$, selected peaks in ppm): −114.94 (s), −116.67 (s), −117.56 (s), −123.84 (s), −124.10 (s), −125.46 (s), −131.38 (s), −132.82 (s), −143.95 (s), −144.93 (s);

$^{13}$C NMR (CDCl$_3$, selected peaks in ppm): —1.23 (s), —0.52 (s), —0.07 (s), 0.24 (s), 0.33 (s), 0.60 (s), 0.76 (s), 7.34 (s), 13.83 (s), 19.01 (s), 19.42 (s), 26.62 (s), 34.75 (s), 62.10 (s), 70.66 (s), 109.44 (s) 118.89 (m);

GPC: M$_n$=2900, M$_w$=4300;
Polydispersity=1.5;
TGA (10° C./min. in air): 160° C. (onset of mass loss), 514° C. (50% mass loss), residue 39% at 900° C.; and
DSC (10° C./min. in N$_2$): Tg −113° C.

Example 2

Synthesis of hyperbranched (perfluorocarbon/siloxane) polymers HBP-[(CF$_2$)$_n$]—(SiMe$_2$H) (n=6) using 1,6-divinylperfluorohexane (A$_2$) and tetrakis (dimethylsiloxy)silane (B$_4$) with [B$_4$]/[A$_2$] ratio of 1.3

A 25 mL round-bottom flask equipped with a vertical cooling condenser was charged with 1,6-divinylperfluorohexane (0.594 g, 97%, 1.63 mmol), tetrakis (dimethylsiloxy)silane (0.730 g, 97.1%, 2.16 mmol) and 2 mL of THF. It was flushed and then stirred under N$_2$ for 5 min. To the reaction mixture was added 11.5 mg of the Karstedt's catalyst (~2% platinum-divinyltetramethyl-disiloxane complex in xylene). It was stirred at RT for 1 hr, and then at 65° C. for 2 days. The volatiles were stripped off in a rotary evaporator. The product was washed with anhydrous acetonitrile (3×5 mL). Each time the solution was pre-cooled with a dry ice bath before the acetonitrile was decanted from the product phase. The volatiles were stripped off in a rotary evaporator at RT, and the resulting colorless viscous oil was further dried in a vacuum overnight. A viscous colorless oil designated as HBP—[(CF$_2$)$_n$]—(SiMe$_2$H) (n=6) (0.85 g) was obtained. Its spectral and other data were as follows:

IR on KBr disc (selected peaks in cm$^{-1}$): 2962, 2935, 2908, 2870, 2134 (Si—H), 1712 (weak), 1449, 1386, 1261, 1196, 1073, 986, 906, 844, 801, 771, 720, 620;

$^1$H NMR (CDCl$_3$, selected peaks in ppm): (1) Peaks assigned to the ideal polymer structure from hydrosililation reaction: 0.12-0.23 (m, SiCH$_3$), 0.91 (t, $^3$J 7.3 Hz, CF$_2$CH$_2$CH$_2$Si), 2.05 (b, CF$_2$CH$_2$CH$_2$Si), 4.72 (septet, $^3$J 2.84 Hz, SiMe$_2$H), (2) Unidentified peaks from the side reaction: 0.42-0.83 (m), 1.32-1.77 (m), 3.40 (s), 3.42 (s), 3.67 (t, J 6.84 Hz), 3.70-3.90 (m), 4.60 (s), 5.56 (quartet J 7.32 Hz), 5.67 (quartet, J 7.08 Hz);

$^{19}$F NMR (CDCl$_3$, selected peaks in ppm): −114.93 (s), −116.68 (s), 117.97 (s), −122.42 (s), 123.94 (s), −124.71 (s), −131.31 (s), −133.37 (s);

$^{13}$C NMR (CDCl$_3$, selected peaks in ppm): −1.39 (s), −1.32 (s), 0.64-0.64 (m), 7.26 (s), 8.67 (s), 13.83 (s), 18.98 (s), 19.38 (s), 24.92-26.25 (m), 26.57 (s), 27.92-31.90 (m), 34.69 (s), 62.07 (s), 67.78 (s), 70.64 (s), 107.71-121.88 (m);

GPC: M$_n$=4400, M$_w$=13,000;
Polydispersity=3.0;
TGA (10° C./min. in air): 218° C. (onset of mass loss), 467° C. (50% mass loss), residue 22% at 900° C.; and
DSC (10° C./min. in N$_2$): Tg −88.5° C.

Example 3

Synthesis of hyperbranched (perfluorocarbon/siloxane) polymers HBP-[(CF$_2$)$_n$]—(SiMe$_2$H) (n=8) using 1,8-divinylhexadecafluorooctane (A$_2$) and tetrakis(dimethylsiloxy)silane (B$_4$) with [B$_4$]/[A$_2$] ratio of 1.5

A 25 mL round-bottom flask equipped with a vertical cooling condenser was charged with 1,8-divinylhexadecafluorooctane (1.0029 g, 98%, 2.17 mmol), tetrakis (dimethylsiloxy)silane (1.1616 g, 97.1%, 3.43 mmol) and 5 mL of THF. It was flushed and then stirred under N$_2$ for 5 min. To the reaction mixture was added 14 mg of the Karstedt's catalyst (~2% platinum-divinyltetramethyl-disiloxane complex in xylene). It was stirred at RT for 1 hr, and then at 80° C. for 2 days. The THF solvent was removed with a rotary evaporator at RT. The product was washed with anhydrous acetonitrile (3×5 mL). Each time, the solution was pre-cooled with a dry ice bath before the acetonitrile was decanted from the product phase. The volatiles were stripped off in a rotary evaporator at RT, and the colorless viscous oil product designated as HBP—[(CF$_2$)$_n$]—(SiMe$_2$H) (n=8) was further dried in vacuum overnight. A viscous colorless oil designated as HBP—[(CF$_2$)$_n$]—(SiMe$_2$H) (n=8) (0.85 g) was obtained. Its spectral and other data were as follows:

IR on KBr disc (selected peaks in cm$^{-1}$): 2963, 2941 (shoulder), 2904, 2872, 2134 (SiH), 1712 (weak), 1449, 1387, 1260, 1211, 1074, 904, 843, 801, 772, 625;

$^1$H NMR (CDCl$_3$, selected peaks in ppm): (1) Peaks assigned to the ideal polymer structure from hydrosilation reaction: 0.14 (s, SiCH$_3$), 0.18 (s, SiCH$_3$), 0.23 (SiCH$_3$), 0.93 (t, $^3$J 7.3 Hz, CF$_2$CH$_2$CH$_2$Si), 1.34-2.46 (m, CF$_2$CH$_2$CH$_2$Si and entities from side reactions), 4.74 (septet, $^3$J, 2.6 Hz, SiMe$_2$H), (2) Unidentified peaks from the side reaction: 0.76-0.86 (m), 3.41-4.05 (m), 4.63 (s), 5.58-5.70 (m);

$^{19}$F NMR (CDCl$_3$, selected peaks in ppm): −114.88 (s), −116.63 (s), −117.10 (s), −122.38 (s), −123.85 (s), −124.06 (s), −131.43 (s), −133.56 (s);

$^{13}$C NMR CDCl$_3$, selected peaks in ppm): −1.33, −0.779 (m), 7.25 (s), 8.67 (s), 13.84 (s), 16.76 (s), 19.00 (s), 19.40 (s), 20.14 (s), 24.90 (s), 25.21 (s), 25.52 (s), 25.66 (s), 25.93 (s), 26.26 (s), 26.58 (s), 27.87 (s), 28.17 (s), 28.46 (s), 28.94 (s), 29.26 (s), 30.92 (s), 31.31 (s), 31.82 (s), 32.26 (s), 34.71 (s), 62.11 (s), 67.81 (s), 70.66 (s), 77.85 (s), 107.26 (s), 121.90 (m), 132.07 (s);

GPC M$_n$=3900, M$_w$=10100;
Polydispersity=2.6;

TGA (10° C./min. in air): 315° C. (onset of mass loss), 453° C. (50% mass loss), residue 15% at 900° C.; and DSC (10° C./min. −175° C. to 200° C. in $N_2$): a Tg was not observed.

Example 4

Synthesis of hyperbranched (perfluorocarbon/siloxane) polymers HBP-allyl[$(CF_2)_n$]—($SiMe_2H$) (n=4) using 4,4,5,5,6,6,7,7-octafluorodeca-1,9-diene ($A_2$) and tetrakis(dimethylsiloxy)silane ($B_4$) with [$B_4$]/[$A_2$] 1.5

A 50 mL round-bottom flask equipped with a vertical cooling condenser was charged with 4,4,5,5,6,6,7,7-octafluorodeca-1,9-diene (1.0 g, 3.12 mmol) and tetrakis (dimethylsiloxy)silane (1.61 g, 4.75 mmol) and 2 mL of THF. The mixture was flushed and then stirred under $N_2$ for 5 mins. To the mixture was added 0.0101 g of the Karstedt's catalyst (~2% platinum-divinyltetramethyl-disiloxane complex in xylene). It was stirred at RT for 20 min., then heated in an oil bath at 50° C. for 16 hrs. THF was stripped off and the product was washed with anhydrous acetonitrile (5×10 mL). Each time, the solution was pre-cooled with a dry ice bath before the acetonitrile was decanted from the product phase. The remaining volatiles in the product were stripped off in a rotary evaporator at RT, and the resulting viscous oil product designated as HBP-allyl[$(CF_2)_n$]—($SiMe_2H$) (n=4) was further dried in a vacuum oven overnight. The yield was 1.83 g. {The same product can also be prepared via bulk reactions using Rh catalyst [chlorotris(triphenylphosphine)-rhodium].} Its spectral and other data were as follows:

IR on KBr disc (selected peaks in $cm^{-1}$): 2961, 2904, 2887, 2133 (SiH), 1464, 1438, 1416, 1372, 1320, 1256, 1195, 1078, 905, 838, 799, 771, 628;

$^1$H NMR ($CDCl_3$, in ppm): 0.126 (s, $SiCH_3$), 0.132 (s, $SiCH_3$), 0.140 (s, $SiCH_3$), 0.206 (s, $SiCH_3$), 0.214 (s, $SiCH_3$), 0.223 (s, $SiCH_3$), 0.61-0.66 (m, $CF_2CH_2CH_2CH_2Si$), 1.620-1.73 (m, $CF_2CH_2CH_2CH_2Si$), 2.02-2.31 (m, $CF_2CH_2CH_2CH_2Si$), 4.72 (m, $SiMe_3H$);

$^{19}$F NMR ($CDCl_3$, in ppm): −115.00 (s, $CF_2$), −124.00 (s, $CF_2$);

$^{13}$C NMR ($CDCl_3$, in ppm): −0.29 (s, $SiCH_3$), −0.27 (s, $SiCH_3$), −0.25 (s, $SiCH_3$), 0.31 (s, $SiCH_3$), 0.33 (s, $SiCH_3$), 14.46 (s, $CF_2CH_2CH_2CH_2Si$), 17.86 (s, $CF_2CH_2CH_2CH_2Si$), 34.69 (t, $^3J$ 22 Hz, $CF_2CH_2CH_2CH_2Si$), 109.14 (t, J 33 Hz ($CF_2$)$_4$), 111.77 (t, J 33 Hz ($CF_2$)$_4$), 114.40 (t, J 33 Hz, ($CF_2$)$_4$), 115.86 (t, J 30 Hz), 118.39 (t, J 31 Hz, ($CF_2$)$_4$), 120.91 (t, J 31 Hz, ($CF_2$)$_4$);

$^{29}$Si NMR ($CDCl_3$, in ppm): −102.18 (s, Si(O—)$_4$), −102.57 (s Si(O—)$_4$), −102.86 (s, Si(O—)$_4$), −3.63 (s, $OSiMe_2H$), −3.51 (s, $OSiMe_2H$), −3.45 (s, $OSiMe_2H$), 10.24 (s, $CH_2SiMe_2O$), 10.37 (s, $CH_2SiMe_2O$), 10.51 (s, $CH_2SiMe_2O$);

GPC: $M_n$=3700, $M_w$=8300;

Polydispersity=2.3;

TGA (10° C./min. in air): 373° C. (onset of mass loss), 509° C. (50% mass loss), residue 40% at 900° C.;

DSC (10° C./min. in $N_2$): Tg −89° C.

Example 5

Synthesis of hyperbranched (perfluorocarbon/siloxane) polymers HBP-allyl[$(CF_2)_n$]—($SiMe_2H$) (n=6) using 4,4,5,5,6,6,7,7,8,8,9,9-Dodecafluoro-1,11-dodecadiene ($A_2$) and tetrakis(dimethylsiloxy)silane ($B_4$) with [$B_4$]/[$A_2$] 1.5

4,4,5,5,6,6,7,7,8,8,9,9-Dodecafluoro-1,11-dodecadiene (1.264 g) (prepared using a method adapted from the literature [A. Manseri, et al., *J. Fluorine Chem.* 73, 151-158 (1995)] was weighed into a round-bottomed flask equipped with a cooling condenser. Tetrakis(dimethylsiloxy)silane (Gelest SIT7278.0, 1.7027 g) was added, followed by 1 mL of THF. The mixture was flushed and then stirred under $N_2$ for 5 mins. To the mixture was added 0.0107 g of the Karstedt's catalyst (~2% platinum-divinyltetramethyl-disiloxane complex in xylene). The mixture was stirred at RT for 20 min, then heated in an oil bath at 50° C. for 16 hrs. The THF solvent was stripped off and the product was washed with anhydrous acetonitrile (5×10 mL). Each time, the solution was pre-cooled with a dry ice bath before the acetonitrile was decanted from the product phase. The remaining volatiles in the product phase were stripped off in a rotary evaporator at RT, and the resulting viscous oil product designated as HBP-allyl[$(CF_2)_n$]—($SiMe_2H$)$_{m'}$ (n=6) was further dried in a vacuum oven overnight. The yield was 1.7043 g. {The same product can also be prepared via bulk reactions using Rh catalyst [chlorotris (triphenylphosphine)-rhodium].} Its spectral and other data were as follows:

IR on KBr disc (selected peaks in $cm^{-1}$): 2961, 2904, 2891, 2134 (SiH), 1464, 1416, 1377, 1321, 1256, 1203, 1075, 903, 799, 772, 630;

$^1$H NMR ($CDCl_3$, in ppm): 0.130 (s, $SiCH_3$), 0.136 (s, $SiCH_3$), 0.143 (s, $SiCH_3$), 0.208 (s, $SiCH_3$), 0.216 (s, $SiCH_3$), 0.224 (s, $SiCH_3$), 0.62-0.67 (m, $Si(CH_2CH_2CH_2CF_2)$), 1.66-1.71 (m, $Si(CH_2CH_2CH_2CF_2)$), 2.07-2.11 (m, $Si(CH_2CH_2CH_2CF_2)$), 4.72-4.75 (m, $SiMe_2H$);

$^{19}$F NMR ($CDCl_3$, in ppm): −124.24 (s, $CF_2$), −122.37 (s, $CF_2$), −114, 92 (s, $CF_2$);

$^{13}$C NMR ($CDCl_3$, in ppm): −0.30 (s, $SiCH_3$), −0.27 (s, $SiCH_3$), 14.41 (s, $CF_2CH_2CH_2CH_2Si$), 14.45 (s, $CF_2CH_2CH_2CH_2Si$), 17.84 (s, $CF_2CH_2CH_2CH_2Si$), 34.59 (t, $^3J$ 22.44 Hz, $CF_2CH_2CH_2CH_2Si$), 108.21-121.32 (m, ($CF_2$)$_6$);

$^{29}$Si NMR ($CDCl_3$, in ppm): −104.21 to −103.55 (m, Si(O—)$_4$), −4.91 to −4.68 (m, $OSiMe_2H$), 8.90 to 9.11 (m, $CH_2SiMe_2O$);

GPC: $M_n$=3800, $M_{w=6400}$;

Polydispersity=1.7;

TGA (10° C./min. in air): 289° C. (onset of mass loss), 488° C. (50% mass loss), residue 36% at 900° C.; and DSC (10° C./min. in $N_2$ from −90 to 259° C.): a Tg was not observed, $T_m$ −62.5° C.

Example 6

Synthesis of hyperbranched (perfluorocarbon/siloxane) polymers HBP-allyl[$(CF_2)_n$]—($SiMe_2H$) (n=8) using diallyl perfluorooctane ($A_2$) and tetrakis(dimethylsiloxy)silane ($B_4$) with [$B_4$]/[$A_2$] 1.5

Diallyl perfluorooctane $CH_2=CHCH_2(CF_2)_8CH_2CH=CH_2$ (0.5 g) (prepared using a method adapted from the literature [A. Manseri, et al., *J. of Fluorine Chem.* 73, 151-158) (1995)] was weighed into a round-bottomed flask equipped with a cooling condenser. Tetrakis(dimethylsiloxy)silane (Gelest SIT7278.0, 0.512 g) was added followed by 0.0074 g of Karstedt's catalyst (~2% platinum-divinyltetramethyl-disiloxane complex in xylene). The flask was flushed with nitrogen for 30 secs. The mixture was reacted at RT for 1 hr and then heated up in an oil bath at 50° C. overnight. The viscous oil was washed with anhydrous acetonitrile (5×5 mL) to remove unreacted reagents and low molecular weight entities and then dried using a rotary evaporator. The viscous oil product designated as HBP-allyl[$(CF_2)_n$]—($SiMe_2H$) (n=8)

was further dried under vacuum for 5 hrs. The yield was 0.9 g. Its spectral and other data were as follows:

IR on KBr disc (selected peaks in cm$^{-1}$): 2962, 2903, 2887, 2805, 2134 (SiH), 1464, 1438, 1418, 1377, 1323, 1256, 1213, 1163, 1150, 1076, 967, 904, 839, 800, 772, 722, 700, 651, 628, 568, 556, 535;

$^1$H NMR (CDCl$_3$, in ppm): 0.144 (s, SiCH$_3$), 0.151 (s, SiCH$_3$), 0.215 (s, SiCH$_3$), 0.223 (s, SiCH$_3$), 0.229 (s, SiCH$_3$), 0.63-0.67 (m, Si(CH$_2$CH$_2$CH$_2$CF$_2$)), 1.69-1.72 (m, Si(CH$_2$CH$_2$CH$_2$CF$_2$)), 2.06-2.14 (m, Si(CH$_2$CH$_2$CH$_2$CF$_2$)), 4.73-4.75 (m, Me$_2$SiH);

$^{19}$F NMR (CDCl$_3$, in ppm): −137.71 (s, CF$_2$), −137.57 (s, CF$_2$), −130.07 (s, CF$_2$ at chain end), −124.18 (s, CF$_2$), −123.96 (s, CF$_2$), −122.46 (s, CF$_2$), −122.29 (s, CF$_2$), −114.96 (s, CF$_2$);

$^{13}$C NMR (CDCl$_3$, in ppm): −0.305 (s, SiCH$_3$), −0.30 (s, SiCH$_3$), 0.24 (s, SiCH$_3$), 0.28 (s, SiCH$_3$), 14.31 (s, CF$_2$CH$_2$CH$_2$CH$_2$Si), 14.35 (s, CF$_2$CH$_2$CH$_2$CH$_2$Si), 17.76 (s, CF$_2$CH$_2$CH$_2$CH$_2$Si), 34.44 (t, $^3$J 22.07 Hz, CF$_2$CH$_2$CH$_2$CH$_2$Si), 108.20-121.23 (m, (CF$_2$)$_8$);

$^{29}$Si NMR (CDCl$_3$, in ppm): −105.09 (s, Si(O—)$_4$), −6.03 to −5.9 (m, OSiMe$_2$H), 7.73 to 7.95 (m, CH$_2$SiMe$_2$O);

GPC: M$_n$=4400, M$_w$=15100;

Polydispersity=3.5;

TGA (10° C./min. in air): 302° C. (onset of mass loss), 468° C. (50% mass loss), residue 31% at 900° C.; and DSC (10° C./min. in N$_2$ from −90 to 200° C.): a Tg was not observed, T$_m$ 23° C.

Example 7

Modification of HBP-allyl[(CF$_2$)$_n$]—(SiMe$_2$H) (n=6) with vinyltrimethoxysilane A 25 mL round-bottomed flask equipped with a vertical cooling condenser was charged with 1.6448 g of HBP-(Allyl)[(CF$_2$)$_6$]—(SiMe$_2$H) and 1.707 g vinyl-trimethoxylsilane. It was flushed with N$_2$ and stirred for 5 mins. To the reaction mixture was added 0.0115 g of Karstedt's catalyst (~2% platinum-divinyltetramethyl-disiloxane complex in xylene). It was stirred at RT for 1 hr and then heated in an oil bath at 50° C. for 16 hrs. IR of the crude product showed the SiH peak disappeared. The viscous oil was washed with anhydrous acetonitrile (5×10 mL) and dried in a rotary evaporator. The viscous oil product designated as HBP-(Allyl)[(CF$_2$)$_6$]—[SiMe$_2$HCH$_2$CH$_2$Si(OMe)$_3$] was further dried under vacuum for 5 hrs. The yield was 1.20 g. Its spectral and other data were as follows:

IR on KBr disc (selected peaks in cm$^{-1}$): 2918, 2957, 2841 (SiOCH$_3$), 1463, 1439, 1410, 1377, 1324, 1256, 1195, 1141, 1088, 1003, 836, 798, 735, 718, 692, 624, 604, 564, 535;

$^1$H NMR (CDCl$_3$, in ppm): 0.071 (s, SiCH$_3$), 0.074 (s, SiCH$_3$), 0.11 (s, SiCH$_3$), 0.12 (s, SiCH$_3$), 0.15 (s, SiCH$_3$), 0.56 (s, Si(C$_2$H$_4$)Si, 0.58-0.62 (m, CF$_2$CH$_2$CH$_2$CH$_2$Si), 1.62-1.66 (m, CF$_2$CH$_2$CH$_2$CH$_2$Si), 2.1 (b, CF$_2$CH$_2$CH$_2$CH$_2$Si), 1.62-1.66 (m, CH$_2$SiCH—CH$_3$ from side reaction of reverse addition); 3.55 (s, SiOCH$_3$);

$^{19}$F NMR (CDCl$_3$, in ppm): −124.28 (s, CF$_2$), −122.42 (s, CF$_2$), −115.00 (s, CF$_2$);

$^{13}$C NMR (CDCl$_3$, selected peaks in ppm): −1.096 (s, SiCH$_3$), −1.059 (s, SiCH$_3$), −1.044 (s, SiCH$_3$), −0.427 (s, SiCH$_3$), −0.412 (s, SiCH$_3$), 0.54-0.79 (s, SiCH$_3$); 5.23 (s), 5.25 (s), 7.24 (s), 7.28 (s), 7.30 (s), 8.76 (s, Si(C$_2$H$_4$)Si), 8.79 (s, Si(C$_2$H$_4$)Si), 14.25 (s, CF$_2$CH$_2$CH$_2$CH$_2$Si), 17.75 (s, CF$_2$CH$_2$CH$_2$CH$_2$Si), 17.76 (a, CF$_2$CH$_2$CH$_2$CH$_2$Si), 34.35 (t, 22.07 Hz, CF$_2$CH$_2$CH$_2$CH$_2$Si), 50.36 (s, SiOCH$_3$), 50.37 (s, SiOCH$_3$), 50.43 (s, SiOCH$_3$), 108.22-120.77 (m, (CF$_2$)$_6$);

$^{29}$Si NMR (CDCl$_3$, in ppm): −104.62 (m, Si(O—)$_4$), −41.57 (m, CH$_2$Si(OMe)$_3$), 8.23-8.70 (m, CH$_2$SiMe$_2$O), 9.65-10.10 (m, CH$_2$SiMe$_2$O);

GPC: M$_n$=7600, M$_w$=13200;

Polydispersity=1.7;

TGA (10° C./min. in air): Initial mass loss at 7.7% before 200° C. due to the unstable chain ends Si(OMe)$_3$, 228° C. (onset of decomposition), 480° C. (50% mass loss), residue 34% at 900° C.; and DSC (10° C./min. in N$_2$ from −90 to 200° C.): a Tg was not observed.

Example 8

Modification of HBP-allyl[(CF$_2$)$_n$]—(SiMe$_2$H) (n=6) with vinyltriethoxysilane A 50 mL round-bottomed flask equipped with a vertical cooling condenser was charged with 3.8 g HBP-(Allyl)[(CF$_2$)$_6$]—(SiMe$_2$H) and 5.2 g of vinyltriethoxysilane. It was flushed with N$_2$ and stirred for 5 mins. To the reaction mixture was added 0.0245 g of Karstedt's catalyst (~2% platinum-divinyltetramethyldisiloxane complex in xylene). It was stirred at RT for 1 hr and then heated in an oil bath at 50° C. for 16 hrs. IR of the crude product showed that the SiH peak had disappeared. The viscous oil was washed with anhydrous acetonitrile (5×15 mL) and dried in a rotary evaporator. The viscous oil product designated as HBP-(Allyl)[(CF$_2$)$_6$]—[SiMe$_2$HCH$_2$CH$_2$Si(OEt)$_3$] was further dried under vacuum for 5 hrs. The yield was 3.8 g. Its spectral and other data were as follows:

IR on KBr disc (selected peaks in cm$^{-1}$): 2974, 2927, 2886, 2735, 1483, 1462, 1442, 1408, 1390, 1256, 1203, 1167, 1140, 1104, 1079, 996, 957, 840, 788, 719, 692, 649, 625, 604, 585, 535;

$^1$H NMR (CDCl$_3$, in ppm): 0.047 (s, SiCH$_3$), 0.055 (s, SiCH$_3$), 0.77 (s, SiCH$_3$), 0.86 (s, SiCH$_3$), 0.094 (s, SiCH$_3$), 0.13 (s, SiCH$_3$), 0.14 (s, SiCH$_3$), 0.53 (s, Si(C$_2$H$_4$)Si), 0.56-0.60 (m, CF$_2$CH$_2$CH$_2$CH$_2$Si), 1.08 (d, $^2$J 7.63 Hz, CH$_2$SiCH—CH$_3$ from side reaction of reverse addition); 1.15-1.20 (m, OCH$_2$CH$_3$), 1.62-1.63 (b, CF$_2$CH$_2$CH$_2$CH$_2$Si), 2.01-2.05 (b, CF$_2$CH$_2$CH$_2$CH$_2$Si), 3.78 (quartet, $^3$J 7.00 Hz, SiOCH$_2$CH$_3$);

$^{19}$F NMR (CDCl$_3$, in ppm): −124.31 (s, CF$_2$), −123.83 (s, CF$_2$), −122.45 (s, CF$_2$), −115.05 (s, CF$_2$), −113.81 (s, CF$_2$);

$^{13}$C NMR (CDCl$_3$, selected peaks in ppm): −1.171 (s, SiCH$_3$), −1.096 (s, SiCH$_3$), −1.037 (s, SiCH$_3$), −0.494 to −0.367 (s, SiCH$_3$), 0.54 to 0.79 (s, SiCH$_3$); 1.78 (s, Si(C$_2$H$_4$) Si), 8.90 (s, Si(C$_2$H$_4$)Si), 8.93 (s, Si(C$_2$H$_4$)Si), 14.25 (s, CF$_2$CH$_2$CH$_2$CH$_2$Si), 17.71 to 17.87 (m, CF$_2$CH$_2$CH$_2$CH$_2$Si), 18.07 to 18.15 (m, OCH$_2$CH$_3$), 34.37 (t, $^3$J 22.67 Hz, CF$_2$CH$_2$CH$_2$CH$_2$Si), 58.21 (s with satellite peaks, OCH$_2$CH$_3$), 108.23-125.22 (m, (CF$_2$)$_6$);

$^{29}$Si NMR (CDCl$_3$, in ppm): −115.55 to −102.48 (m, Si(O—)$_4$), −47.17 to −45.86 (m, CH$_2$Si(OEt)$_3$), 6.34 to 7.52 (m, CH$_2$SiMe$_2$O), 8.21 to 9.23 (m, CH$_2$SiMe$_2$O);

GPC: M$_n$=4400, M$_w$=5700;

Polydispersity=1.3;

TGA (10° C./min. in air): 209° C. (onset of mass loss), 440° C. (50% mass loss), residue 39% at 900° C. (10° C./min. in N$_2$ from −90 to 200° C.): a Tg was not observed.

Example 9

Attempted synthesis of linear poly(perfluorinated alkane-dimethylsiloxane) —[C$_4$F$_8$C$_3$H$_6$(SiMe$_2$O) SiMe$_2$C$_3$H$_6$]$_n$— from 4,4,5,5,6,6,7,7-octafluorodeca-1,9-diene and 1,1,3,3-tetramethyldisiloxane 4,4,5,5,6,6,7,7-Octafluorodeca-1,9-diene (1.5 g, 4.67 mmol, 87.8% purity) was weighed into a round-bottomed flask equipped with a cooling condenser. 1,1,3,3-tetramethyldisiloxane (0.68 g, 4.91 mmol, 97% purity) was added followed by 0.0104 g of Karstedt's catalyst (~2% platinum-divinyltetramethyl-disiloxane complex in xylene). The flask was flushed with nitrogen for several sec. The mixture was reacted at RT for 1 hr and then heated in an oil bath at 50° C. for 3 days. The reaction was allowed to cool to RT and the resulting mixture was examined by FTIR spectroscopy, which showed that the reaction did not go to completion as both a vinyl and a SiH band remained although excess of tetramethyldisiloxane was used. The product appeared to be of very low viscosity. GPC confirmed the molecular weight of the product was very low, with $M_n=1500$ and $M_w=1700$, and a polydispersity=1.2. The reaction when conducted in anhydrous THF gave a similar product.

Example 10

Synthesis of telechelic diallyl poly(perfluorinated alkane-dimethylsiloxane) $CH_2=CHCH_2[C_4F_8C_3H_6(SiMe_2O)_2SiMe_2C_3H_6]_nC_4F_8CH_2CH=CH_2$ from 4,4,5,5,6,6,7,7-octafluorodeca-1,9-diene and 1,1,3,3,5,5-hexamethyltrisiloxane It was found that the reactant 1,1,3,3-tetramethyldisiloxane was very volatile. This may have been the reason why the linear polymerization in Example 9 did not go to completion as the real reactant ratio may have deviated from the mixing ratio. A modified polymerization using non-volatile 1,1,3,3,5,5-hexamethyltrisiloxane was then conducted. 4,4,5,5,6,6,7,7-Octafluorodeca-1,9-diene (0.5 g, 1.755 mmol, 99% purity) was weighed into a round-bottomed flask equipped with a cooling condenser. 1,1,3,3,5,5-Hexamethyltrisiloxane (0.38 g, 1.79 mmol, 98.4% purity) was added, followed by 1 mL of anhydrous THF and 0.0066 g of Karstedt's catalyst (~2% platinum-divinyltetramethyl-disiloxane complex in xylene). The flask was flushed with nitrogen for several sec. The mixture reacted at RT for 1 hr and then was heated in an oil bath at 50° C. overnight. The reaction was allowed to cool to RT and the resulting mixture was examined by FTTR spectroscopy, which was showed by the absence of a Si—H band indicating that the reaction was complete. The obtained reaction mixture was very viscous. All the volatiles were removed using a rotary evaporator. The viscous oil was washed with anhydrous acetonitrile (5×5 mL) and dried in the rotary evaporator. The viscous oil product designated as $CH_2=CHCH_2[C_4F_8C_3H_6(SiMe_2O)_2SiMe_2C_3H_6]_nC_4F_8CH_2CH=CH_2$ was further dried under vacuum for 24 hrs. The yield was 0.6872 g. Its spectral and other data were as follows:

IR on KBr disc (selected peaks in $cm^{-1}$): 2901, 2959, 2885, 2804, 1942 ($CH=CH_2$), 1463, 1438, 1413, 1377, 1323, 1259, 1194, 1164, 1079, 1052, 966, 910, 838, 799, 767, 710, 570, 533;

$^1H$ NMR ($CDCl_3$, in ppm): 0.013 (s, $SiCH_3$), 0.076 (s, $SiCH_3$), 0.583 (t, J 8.41 Hz, $CF_2CH_2CH_2CH_2Si$), 1.61-1.65 (m, $CF_2CH_2CH_2CH_2Si$), 1.96-2.14 (m, $CF_2CH_2CH_2CH_2Si$); 2.815 (doublet of triplet, $^3J_{F,H}$ 18.39 Hz, $^3H_{H,H}$ 6.94 Hz, $CH_2=CHCH_2CF_2$); 5.27-5.32 (m, $CH_2=CHCH_2CF_2$), 5.63-5.85 (m, $CH_2=CHCH_2CF_2$), $^{19}F$ NMR ($CDCl_3$, in ppm): -124.301 (s, $CF_2$), -124.271 (s, $CF_2$), -115.176 (s, $CF_2$), -113.926 (s, $CF_2$);

$^{13}C$ NMR ($CDCl_3$, in ppm): 0.05 (s, $SCH_3$), 1.12 (s, $SiCH_3$), 14.44 (s, $CF_2CH_2CH_2CH_2Si$), 17.93 (s, $CF_2CH_2CH_2CH_2Si$), 34.46 (t, J 22.93 Hz, $CF_2CH_2CH_2CH_2Si$), 108.34-121.13 (m, $(CF_2)_4$);

$^{29}Si$ NMR ($CDCl_3$, in ppm): -21.40 (s, $Me_2Si(O—)_2$), 5.86 (s, $CH_2SiMe_2O—$);

GPC: $M_n=5700$, $M_w=9700$;
Polydispersity=1.7;
TGA (10° C./min. in air): 283° C. (onset of mass loss), 350° C. (50% mass loss);
DSC (10° C./min. in $N_2$): Tg -77° C.

Example 11

Synthesis of telechelic diallyl poly(perfluorinated alkane-dimethylsiloxane) $CH_2=CHCH_2[C_6F_{12}C_3H_6(SiMe_2O)_2SiMe_2C_3H_6]_nC_6F_{12}CH_2CH=CH_2$ from 4,4,5,5,6,6,7,7,8,8,9,9-dodecafluorododeca-1,11-diene and 1,1,3,3,5,5-hexamethyltrisiloxane 4,4,5,5,6,6,7,7,8,8,9,9-Dodecafluorododeca-1,11-diene (0.5 g, 1.31 mmol) was weighed into a round-bottomed flask equipped with a cooling condenser. 1,1,3,3,5,5-Hexamethyltrisiloxane (0.273 g, 1.29 mmol, 98.4% purity) was added, followed by 1 mL of anhydrous THF and 0.0060 g of Karstedt's catalyst (~2% platinum-divinyltetramethyldisiloxane complex in xylene). The flask was flushed with nitrogen. The mixture was reacted at RT for 1 hr, and then was heated in an oil bath at 50° C. overnight. The product was allowed to cool to RT and its FTIR spectrum was obtained. The absence of a Si—H band indicated that the reaction was complete. The volatiles were removed using a rotary evaporator. The resulting viscous oil, designated as $CH_2=CHCH_2[C_6F_{12}C_3H_6(SiMe_2O)_2SiMe_2C_3H_6]_nC_6F_{12}CH_2CH=CH_2$, was washed with anhydrous acetonitrile (5×5 mL) and dried in a rotary evaporator and then dried under vacuum for 24 hrs. The yield was 0.67 g. Its spectral and other data were as follows:

IR on KBr disc (selected peaks in $cm^{-1}$): 2902, 2959, 2886, 2805, 1943, 1648 ($CH_2=CH$), 1463, 1438, 1413, 1376, 1324, 1260, 1200, 1140, 1080, 1052, 930, 841, 799, 768, 712, 692, 650, 561, 535;

$^1H$ NMR ($CDCl_3$, in ppm): 0.019 (s, $SiCH_3$), 0.083 (s, $SiCH_3$), 0.592 (t, J 8.51 Hz, $CF_2CH_2CH_2CH_2Si$), 1.60-1.68 (m, $CF_2CH_2CH_2CH_2Si$), 2.00-2.13 (m, $CF_2CH_2CH_2CH_2Si$); 2.827 (doublet of triplet, $^3J_{F,H}$) 18.29 (Hz, $^3J_{H,H}$ 7.04 Hz, $CH_2HCH_2CF_2$); 5.278-5.333 (m, $CH_2=CHCH_2CF_2$), 5.74-5.83 (m, $CH_2=CHCH_2CF_2$);

$^{19}F$ NMR ($CDCl_3$, in ppm): -137.73 (s, $CF_2$), -137.59 (s, $CF_2$), -130.26 (s, $CF_2$), -124.32 (s, $CF_2$), -123.80 (s, $CF_2$), 122.41 (s, $CF_2$), -115.04 (s, $CF_2$), -113.78 (s, $CF_2$);

$^{13}C$ NMR ($CDCl_3$, in ppm): 0.05 (s, $SCH_3$), 1.07 (s, $SiCH_3$), 14.40-14.47 (m, $CF_2CH_2CH_2CH_2Si$), 17.91 (s, $CF_2CH_2CH_2CH_2Si$), 34.38 (t, J 22.06 Hz, $CF_2CH_2CH_2CH_2Si$), 108.06-122.34 (m, $(CF_2)_6$);

$^{29}Si$ NMR ($CDCl_3$, in ppm): -19.78 (s, $Me_2Si(O—)_2$, 7.40 (s, $CH_2SiMe_2O—$);

GPC: $M_n=8200$, $M_w=13800$;
Polydispersity=1.7;
TGA (10° C./min. in air): 296° C. (onset of mass loss), 377° C. (50% mass loss), residue 0.7% at 900° C.; and
DSC (10° C./min. in $N_2$): two melting peaks were observed at -28° C. and at 5.8° C.

Example 12

Synthesis of telechelic diallyl poly(perfluorinated alkane-dimethylsiloxane) $CH_2=CHCH_2[C_8F_{16}C_3H_6(SiMe_2O)_2SiMe_2C_3H_6]_nC_8F_{16}CH_2CH=CH_2$ from $CH_2=CHCH_2(CF_2)_8CH_2CH=CH_2$ and 1,1,3,3,5,5-hexamethyltrisiloxane $CH_2=CHCH_2(CF_2)_8CH_2CH=CH_2$ (0.50 g, 1.04 mmol) was weighed into a round-bottomed flask equipped with a cooling condenser. 1,1,3,3,5,5-Hexamethyltrisiloxane (0.22 g, 1.04 mmol by 98.4% purity) was added followed by 1 mL of anhydrous THF and 0.0040 g of Karstedt's catalyst (~2% platinum-divinyltetramethyl-disiloxane complex in xylene). The flask was flushed with nitrogen for several secs. The mixture was reacted at RT for 1 hr, and then in an oil bath at 50° C. overnight. The reaction was allowed to cool to RT and a FTIR spectrum of the resulting mixture was obtained. It showed the reaction was complete based on the absence of a Si—H band. All volatiles were removed using a rotary evaporator. The resulting viscous oil designated as $CH_2=CHCH_2[C_8F_{16}C_3H_6(SiMe_2O)_2SiMe_2C_3H_6]_nC_8F_{16}CH_2CH=CH_2$ was washed with anhydrous acetonitrile (5×5 mL) and dried in a rotary evaporator and then further dried under vacuum for 24 hrs. The yield was 0.65 g. Its spectral and other data were as follows:

IR on KBr disc (selected peaks in $cm^{-1}$): 2960, 2886, 2805, 1943 ($CH_2=CHSi$), 1463, 1438, 1414, 1375, 1323, 1276, 1260, 1213 (broad), 1150, 1126, 1056 (broad), 914, 842, 801, 768, 701, 647, 619, 559, 533;

$^1H$ NMR ($CDCl_3$, in ppm): 0.015 (s, $SiCH_3$), 0.073 (s, $SiCH_3$), 0.588 (t, J 8.29 Hz, $CF_2CH_2CH_2CH_2Si$), 1.60-1.68 (m, $CF_2CH_2CH_2CH_2Si$), 2.01-2.11 (m, $CF_2CH_2CH_2CH_2Si$); 3.62-3.75 (m, $CH_2=CHCH_2CF_2$); 5.877 (t, J 5.23 Hz, $C_2H_3CH_2CF_2$), 6.006 (t, J 5.09 Hz, $C_2H_3CH_2CF_2$), 6.137 (t, J 5.18 Hz, $C_2H_3CH_2CF_2$);

$^{19}F$ NMR ($CDCl_3$, in ppm): −137.72 (weak, s, $CF_2$), −137.58 (weak, s, $CF_2$) −130.06 (weak, s, $CF_2$), −124.25, (s, $CF_2$), −123.95 (s, $CF_2$), −122.51 (weak, s, $CF_2$) −122.32 (s, $CF_2$), −115.08 (s, $CF_2$);

$^{13}C$ NMR ($CDCl_3$, in ppm): −0.062 (s, $SCH_3$), 1.054 (s, $SiCH_3$), 14.40 and 14.37 (s, $CF_2CH_2CH_2CH_2Si$), 17.89 (s, $CF_2CH_2CH_2CH_2Si$), 34.30 (t, J 22.07 Hz, $CF_2CH_2CH_2CH_2Si$), 107.63-121.22 (m, $(CF_2)_8$);

$^{29}Si$ NMR ($CDCl_3$, in ppm): −20.02 (s, $Me_2Si(O—)_2$), 7.11 (s, $CH_2SiMe_2O—$);

GPC $M_n=7600$, $M_w=13800$;

Polydispersity=1.8;

TGA (10° C./min. in air): 302° C. (onset of mass loss), 366° C. (50% mass loss), residue 1.2% at 900° C.; and DSC (10° C./min. in $N_2$): two melting peaks were observed at −2.9° C. and at 48.9° C.

Example 13

Synthesis of telechelic diallyl poly(perfluorinated alkane-dimethylsiloxane) $CH_2=CHCH_2[C_6F_{12}C_3H_6(SiMe_2O)_nSiMe_2C_3H_6]_nC_6F_{12}CH_2CH=CH_2$ from 4,4,5,5,6,6,7,7,8,8,9,9-dodecafluorododeca-1,11-diene and hydride-terminated polydimethylsiloxane $CH_2=CHCH_2(CF_2)_6CH_2CH=CH_2$ (0.554 g, 1.45 mmol by 100% purity) was weighed into a round-bottomed flask equipped with a cooling condenser. Hydride-terminated polydimethylsiloxane (DMS-H03 purchased from Gelest, 1 g, SiH 2.9 mmol calculated from $^1H$ NMR) was added followed by 1 mL of anhydrous THF and 0.0060 g of Karstedt's catalyst (~2% platinum-divinyltetramethyl-disiloxane complex in xylene). The flask was flushed with nitrogen for several sec. The mixture was reacted at RT for 1 hr, and then in an oil bath at 50° C. overnight. IR showed that a SiH peak still remained. The reaction was allowed to cool to RT and 0.10 g of $CH_2=CHCH_2(CF_2)_6CH_2CH=CH_2$ was added followed by 0.0022 g of Karstedt's catalyst (~2% platinum-divinyltetramethyl-disiloxane complex in xylene). It was heated to 50° C. in the oil bath for 24 hrs. IR showed the reaction was now complete based on the absence of the Si—H band. All volatiles were removed using a rotary evaporator. The resulting viscous oil was washed with anhydrous acetonitrile (5×5 mL) and dried in a rotary evaporator and then further dried under vacuum for 24 hrs. The yield was 0.84 g. Its spectral data were as follows:

IR on KBr disc (selected peaks in $cm^{-1}$): 2962, 2908, 1644, 1464, 1439, 1413, 1322, 1261, 1261, 1202, 1140, 1092, 801, 706, 692. The SiH band was absent.

Example 14

Preparation of crosslinked network from HBP-allyl [$(CF_2)_6$]—[$SiMe_2C_2H_4Si(OEt)_3$]

HBP—[$(CF_2)_6$]—[$SiMe_2C_2H_4Si(OEt)_3$] (0.2 g) and 10% Sn(II) catalyst (0.2 g hexane solution that had 10% [bis(2-ethylhexanoate) tin] purchased from Gelest) were mixed using a Vortex Mixer and cast on glass micro slides by wire-wound lab rods (wire size #2.5) made by Paul N. Gardner Company. The coatings were cured in an oven at 120° C. for 7 days. The resulting coatings were transparent and clear. The advancing contact angle of water on the coating was 97°.

Example 15

Comparison of Networks from Hyperbranched (Perfluorocarbon/Siloxane) and Hyperbranched Polycarbosiloxane Crosslinked with Telechelic Divinyl Polydimethylsiloxane (Comparative)

To a solution of 3.6 g of vinyl-terminated polydimethylsiloxane (Gelest DMS-V52) and 0.9 g of HBP—(SiOEt)—(SiMe$_2$H) or HBP-allyl[$(CF_2)_n$]—(SiMe$_2$H) (n=4, 6) in 15 mL of heptane was added 0.3 mL of 3-methyl-1-pentyn-3-ol hexane solution (0.2 g/ml). HBP—(SiOEt)-(SiMe$_2$H) was a hyperbranched polymer prepared by hydrosilylation of divinyltetraethoxydisiloxane and tetrakisdimethylsiloxysilane, as described in the U.S. Pat. No. 6,646,089. The mixtures were agitated by a Burrell Wrist-Action shaker at setting 9 for 5 mins. Silicon dioxide (2.47 g) [amorphous, hexamethyldisilazane-treated, particle size 0.02 μm (Gelest SIS6962.0)] was added. The mixtures were vigorously mixed for 7 min. by an Ultra-Turrax T8 Homogenizer that uses Rotor/Stator Generator S8N-5 g and further agitated by the Burrell Wrist-Action shaker at setting 9 for 5 mins. The mixing process using the Ultra-Turrax T8 Homogenizer (7 min.) and Burrell Wrist-Action shaker (5 min.) was repeated and an additional final mixing by the Ultra-Turrax T8 Homogenizer for 7 mins. was conducted. 0.2 mL of the catalyst Pt-complex hexane solution (0.1 g Gelest SIP683 in 1 mL hexane) was added, and the mixtures were shaken by the Burrell Wrist-Action shaker at setting 9 for 5 min. The formulations were poured into a plastic cup, in which a pedestal was placed on the bottom, dried overnight at RT, and further cured for 24 hrs in an oven at 65° C. The plastic cups were removed and the edges of the coatings were trimmed. The coatings water contact angles were determined using DuPont Teflon Tape MIL-SPEC-T277 3A as a control and the test results are shown in FIG. 1. The water contact angle of the coating from hyperbranched polycarbosiloxane was clearly lower than that from the coating containing hyperbranched poly(perfluorocarbon/siloxane), indicating that the latter was significantly more hydrophobic.

Figure 2:
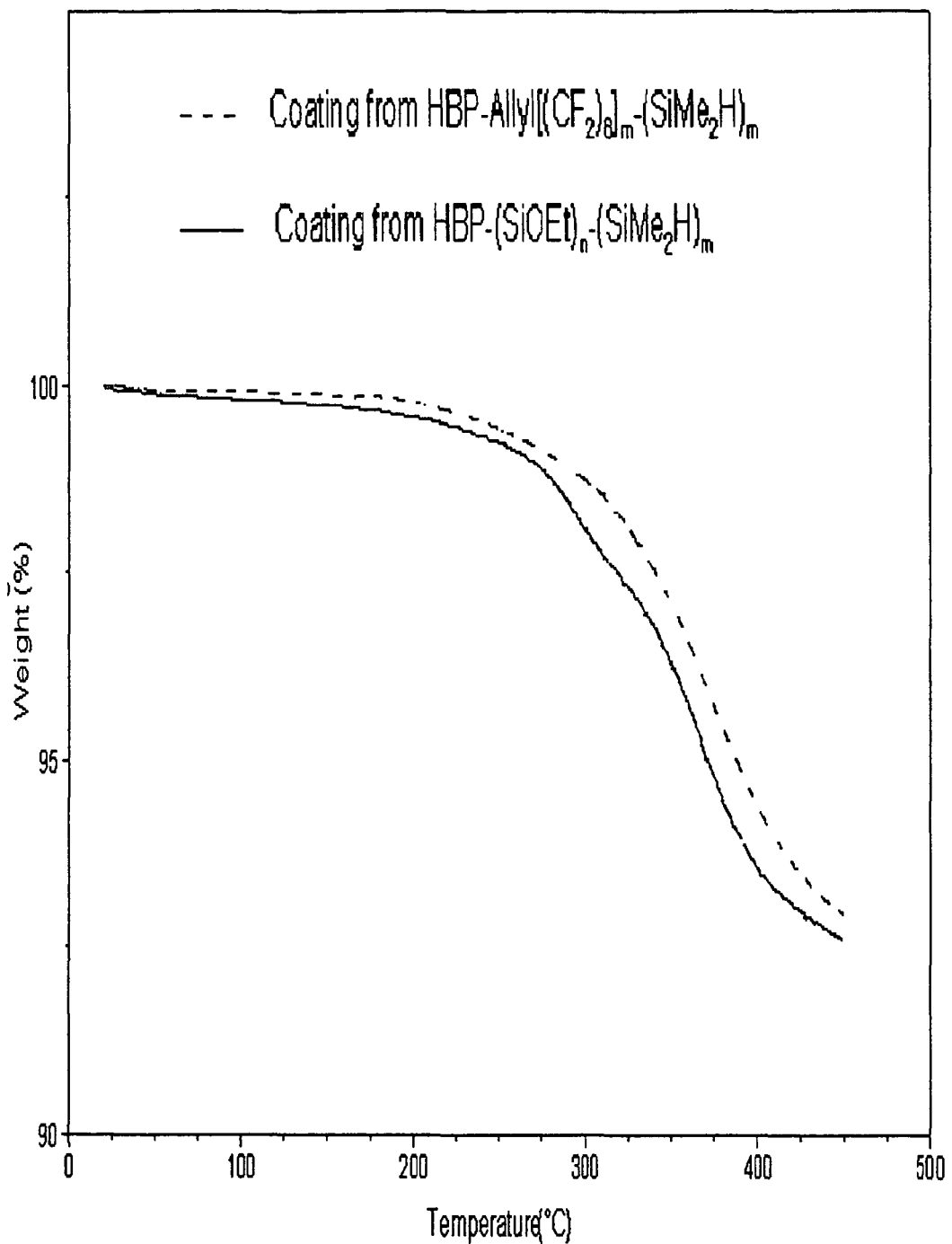
FIG. 2 shows TGA traces of coatings from a formulation of hyperbranched polycarbosiloxane that is designated as HBP—(SiOEt)-(SiMe$_2$H) and from a formulation of hyperbranched polyperfluorocarbon/siloxane that is designated as HBP-allyl[(CF$_2$)$_6$]—(SiMe$_2$H) in Example 15.

The TGA traces (10° C./min. in air) of network coatings from HBP—(SiOEt)-(SiMe$_2$H) with polydimethylsiloxane and HBP-allyl[$(CF_2)_4$]—(SiMe$_2$H) with polydimethlsiloxane are shown in FIG. 2. The results showed that even with as low as 20 wt % of fluorinated HBP-allyl[$(CF_2)_6$]—(SiMe$_2$H)

of Example 5 the thermal stability of network (5% weight loss at 387° C.) was improved in comparison to the non-fluorinated polycarbosiloxane hyperbranched polymer formulations (5% weight loss at 372° C.).

Example 16

Networks from Hyperbranched Poly(Perfluorocarbon/Siloxane) Crosslinked with Telechelic Diallyl Poly(Fluorocarbon/Siloxane)

Linear CH$_2$=CHCH$_2$[C$_6$F$_{12}$C$_3$H$_6$(SiMe$_2$O)$_2$SiMe$_2$C$_3$H$_6$]$_n$ C$_6$F$_{12}$CH$_2$CH=CH$_2$ (0.9 g) (of Example 11) was combined with 0.225 g of HBP(Allyl)-[(CF$_2$)$_6$]—(SiMe$_2$H) (of Example 5) in 3.5 mL of heptane and 0.15 mL of 3-methyl-1-pentyn-3-ol hexane solution (0.20 g/mL). A Burrell Wrist-Action shaker at setting 9 for 5 mins. was used to agitate the solution. Then 0.62 g of Gelest silica (20 nm, HMDS treated) was added, and the mixture was vigorously mixed for 20 mins. using an Ultra-Turrax T8 Homogenizer to disperse the silica. Then 0.10 mL of Pt-complex hexane solution (Gelest SIP 6831 dissolved in hexane at 0.1 g/mL) was added and agitated by the Burrell Wrist-Action shaker at setting 9 for 5 min. The resulting solution was cast into a mold. The solvent was allowed to evaporate at RT and the resulting film was cured at 70° C. overnight. The water contact angle of the film was 117° and the methylene iodide contact angle was 94°.

Figure 3:
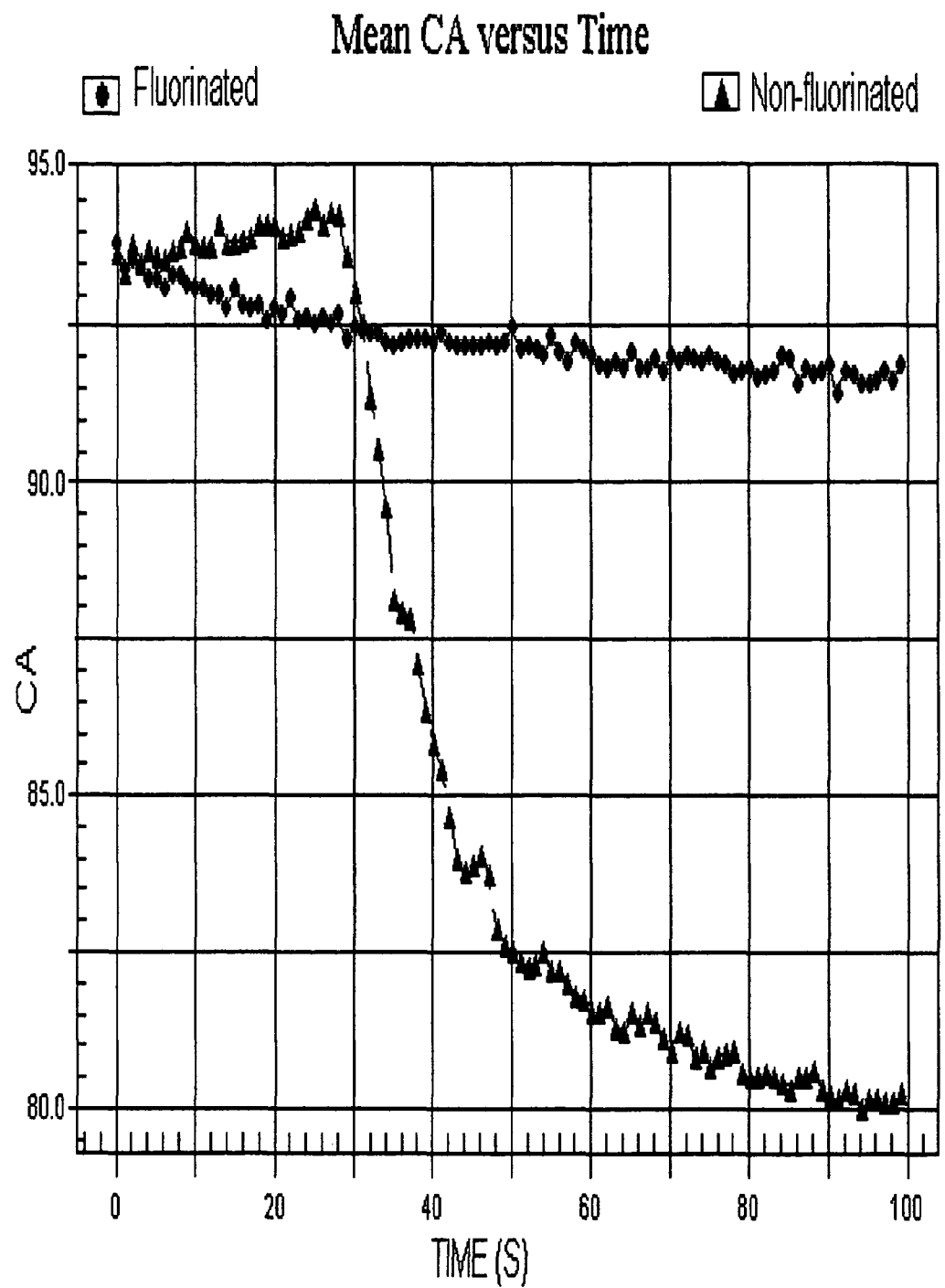
FIG. 3 shows methylene iodide contact angles of the coatings from a formulation of hyperbranched poly(perfluorocarbon/siloxane) that is designated as HBP-allyl[(CF$_2$)$_6$]—(SiMe$_2$H) and crosslinked with telechelic diallyl polyfluorocarbon/siloxane (Example 16) and from a formulation of hyperbranched polycarbosiloxane that is designated as HBP—(SiOEt)-(SiMe$_2$H) and crosslinked with telechelic divinyl polydimethylsiloxane (Example 15).

The time-dependence of the methylene iodide contact angle of a non-fluorinated HBP—(SiOEt)-(SiMe$_2$H) formulation was compared with that of the fluorinated HBP as shown in FIG. 3. Both networks had similar initial contact angles, but that of non-fluorinated polycarbosiloxane catastrophically decreased after about 30 sec., while that of the fluorinated one remained practically unchanged. This indicated that the latter had considerably more stable oleophobicity than the former.

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter.

What is claimed is:

1. Hyperbranched copolymer networks which comprise hyperbranched copolymers containing perfluorocarbon and organosilicon entities that have
   high hydrophobicity as shown by the water contact angle of the network surface in the range of about 95° to about 135°, and/or
   high oleophobicity as shown by the CH$_2$I$_2$ contact angle of the network surface of >90°, and/or
   high thermal stability as shown by lack of degradation below 250° C., and/or
   a glass transition temperature is in the range from about −120° C. to about 25° C., and/or
   good adhesion to substrates, and/or
   any combinations thereof, and
   the networks should exhibit chemical resistance.

2. The hyperbranched copolymers of claim 1 wherein the hyperbranched copolymer is soluble before crosslinking and is readily processed.

3. The hyperbranched copolymers of claim 1 which are devoid of polar groups.

4. The hyperbranched copolymers of claim 1 containing reactive functional end-groups wherein they are crosslinkable by light, heat, moisture, radiation, catalysis, or chemical reaction with an appropriate crosslinking reagent.

5. A process for preparing hyperbranched copolymer networks as claimed in claim 1, which comprises crosslinking hyperbranched copolymers having perfluorocarbon and organosilicon entities with a variety of crosslinking agents to form either rigid or elastomeric networks.

6. The process of claim 5 wherein the crosslinking agent is a linear telechelic diallyl(perfluorinated alkane-dimethylsiloxane) copolymer of the following formula:

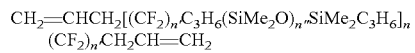

wherein:
n=degree of polymerization of the copolymer;
n'=4, 6 or 8; and
n"≧1.

7. The process of claim 5 wherein the crosslinking agent is a linear (perfluorinated alkane-dimethylsiloxane) copolymer of the following formula:

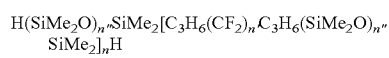

wherein:
n=degree of polymerization of the copolymer;
n'=4, 6 or 8; and
n"≧1.

8. A process for preparing hyperbranched copolymers of claim 1 which comprises reacting an organosilicon monomer containing —SiR$_1$R$_2$H groups, where R$_1$ and R$_2$ are independently alkyl, alkoxyl or H, and a perfluoroalkane containing allyl or vinyl functionalities, wherein the number of SiH or allyl (vinyl) functionalities must be equal to or greater than 2 and one must be equal to or greater than 3.

9. A process for preparing hyperbranched copolymers of claim 1 which comprises reacting organosilicon monomers containing vinyl or allyl functionalities, and perfluoroalkane monomers containing —SiR$_1$R$_2$H groups, where R$_1$ and R$_2$ are alkyl, alkoxyl or H, wherein the number of SiH or allyl (vinyl) functionalities must be equal to or greater than 2 and one must be equal to or greater than 3.

10. A process for preparing hyperbranched copolymers of claim 1 whenever prepared from organosilicon monomers containing —SiR$_1$R$_2$H groups, where R$_1$ and R$_2$ are alkyl, alkoxyl or H, and perfluoroalkane monomers containing vinylether (CH$_2$=CHO—) or allylether (CH$_2$=CHCH$_2$O—) groups, wherein the number of SiH or allyl (vinyl)ether functionalities must be equal to or greater than 2 and one must be equal to or greater than 3.

* * * * *